United States Patent [19]

Greenman et al.

[11] 3,878,643
[45] Apr. 22, 1975

[54] SHRUB PROTECTOR
[75] Inventors: James R. Greenman; Phillip J. Pelky, both of Traverse City, Mich.
[73] Assignee: Pinecrest Engineering, Inc., Traverse City, Mich.
[22] Filed: Sept. 22, 1972
[21] Appl. No.: 291,285

[52] U.S. Cl. ............... 47/28; 47/21; 108/156; 135/3 R; 248/156; 248/165; 248/188.8
[51] Int. Cl. .... A01g 13/02; F16m 11/16; A45f 3/44
[58] Field of Search ................... 47/26–32, 39, 47/44, 45, 47, 28, 21; 248/165, 188.7, 188.8, 188.9, 432, 156, 151; 211/177; 108/156; 135/3 R–4 R; 113/120 W; 220/72

[56] References Cited
UNITED STATES PATENTS

| 53,970 | 4/1866 | Frey et al. ................ 113/120 W |
| 212,306 | 2/1879 | Frederick ...................... 47/31 |
| 893,704 | 7/1908 | Byrne .......................... 47/28 |
| 939,368 | 11/1909 | Withem ...................... 248/300 |
| 1,099,505 | 6/1914 | Llewellin ................... 248/188.8 |
| 1,190,999 | 7/1916 | Harris ........................ 135/4 R |
| 1,198,178 | 9/1916 | Bauer .......................... 47/28 |
| 1,319,400 | 10/1919 | Loveland .................... 248/151 |
| 1,415,782 | 5/1922 | Brace ......................... 248/165 |
| 1,563,700 | 12/1925 | Frankenstein .............. 248/188.9 |
| 2,027,430 | 1/1936 | Hansen ....................... 220/72 |
| 2,036,276 | 4/1936 | Hothersall ................ 113/120 W |
| 2,277,939 | 3/1942 | Thalhammer ............... 248/188.9 |
| 2,399,960 | 5/1946 | Turner ........................ 108/156 |
| 2,578,271 | 12/1951 | Teufel ........................ 47/41 X |
| D59,885 | 12/1921 | Clark et al. ................. 47/28 UX |

FOREIGN PATENTS OR APPLICATIONS

| 138,530 | 5/1930 | Switzerland ..................... 47/44 |

*Primary Examiner*—Edgar S. Burr
*Assistant Examiner*—Steven A. Bratlle
*Attorney, Agent, or Firm*—Price, Heneveld, Huizenga & Cooper

[57] ABSTRACT

A protective apparatus for shrubs, bushes, small plants, and the like for covering and shielding such plants from the damaging effects of the elements, such as snow, ice, hail, and high winds. The apparatus is a frustoconical assembly staked over and around a plant and comprising a central top plate supported over a plant by a plurality of elongated side members spaced circumferentially about the top plate. The side members extend at an angle to the ground and partially cover the sides of the plant. Individual top brackets slidably, removably secure each of the side members to the top plate while individual toe brackets, projecting perpendicularly to the plane of the top plate, vertically stake each of the side members, and, thus, the entire assembly, to the ground around the periphery of the plant.

13 Claims, 5 Drawing Figures 3,878,643

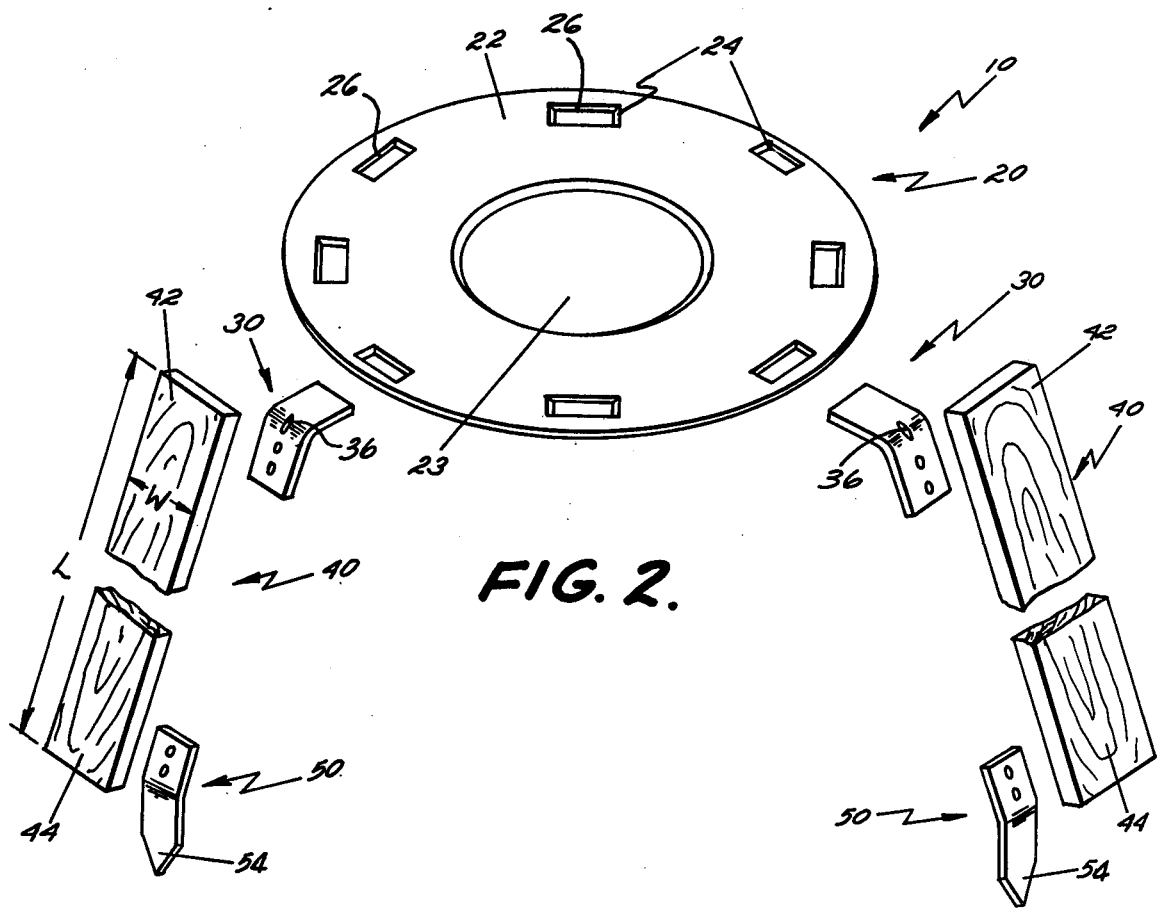
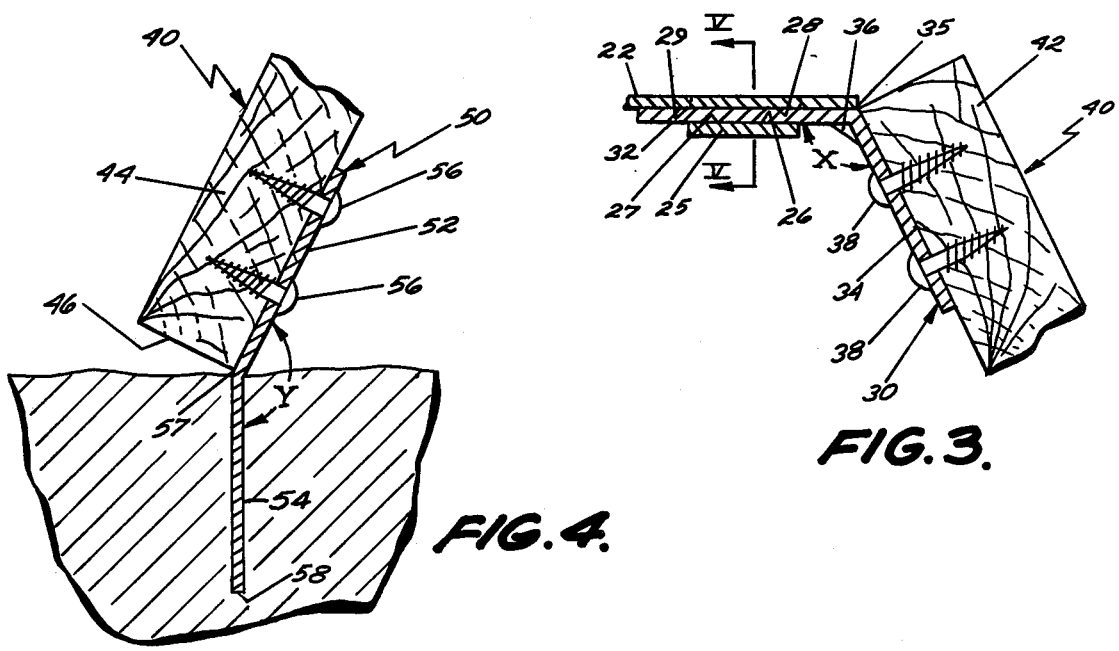

SHRUB PROTECTOR

This invention relates to protective devices for plants, and, more particularly, to a protective apparatus for covering shrubs, bushes, small plants and the like, for protecting against and preventing the destructive effects of the elements on those plants.

BACKGROUND OF THE INVENTION

Typically, plants and shrubs are protected from snow, wind, and the like by tying back their branches or covering them with burlap bags. Some attempts have been made to offer more elaborate shrub guards, but apparently none have met with any degree of success.

Generally, such proposed guards have consisted of a relatively lightweight wire or tubular frame around which is stretched or supported a cover comprised of one of various types of material such as wicker, cloth or wire mesh, straw thatch, or even glass formed into a hood. In order to properly support these enclosures and covers, certain of the prior frameworks have been relatively complex in construction and therefore expensive. Furthermore, the prior plant guards also were generally permanently constructed and therefore could not be disassembled and transported quickly and easily. The cost of shipping such riggings may have been prohibitive. Moreover, the prior guards were often designed to be used over plants of one size and were not easily adaptable to accommodate plants of other sizes. This requires a manufacturer to make several different sized products. In addition, certain of the prior constructions were difficult and time consuming to assemble and locate over the plant to be protected. Therefore, the prior known plant guards were undesirable from one or more of these standpoints.

SUMMARY OF THE INVENTION

The present invention constitutes a plant guard assembly and apparatus which is quickly and easily assembled and disassembled and is therefore easily transportable. It is assemblable prior to its being located over a plant to be protected and is placed thereover in one operation. It provide full protection against the damaging effects of snow and ice buildup as well as strong winds without the necessity of an enclosing cover or hood surrounding the framework of the device. The present invention is easily adapted and modified for use with several different sizes of bushes, shrubs, small plants and the like. It may be staked vertically into the ground over such plants in one operation even though the protective sides of the device extend at an angle to the ground in order to provide sufficient room for the body of the protected plant. Further, the present invention is strong and durable in construction, will withstand the severest of elements with little or no maintenance, and is inexpensive, simple and convenient to use.

The invention comprises four separate elements assembled to form a frusto-conical covering for the plant to be protected. In the preferred embodiment, the four primary elements include a top plate member supported parallel to the ground over a plant by a plurality of elongated side members spaced about the periphery of the top plate member and extending at an angle from the top plate to the ground. The side members are secured between the top plate and ground by two separate bracket means fastened to each side member. One of the bracket means comprises a top bracket including two flanges formed at an angle with one another, one of the flanges being secured to one end of one of the side members while the remaining flange is slidably removably secured to the top plate. The remaining bracket means comprises a bottom or toe bracket also includiing two flanges formed at an angle with one another. One flange of the toe bracket is secured to the end of the side member opposite the end to which the top bracket is secured, while the remaining flange is staked vertically into the ground surrounding the plant. The angle between the two flanges of the toe bracket is such that the flange staked into the ground projects perpendicularly to the plane of the top plate. Consequently, when staked vertically into the ground, the toe brackets support the top plate parallel to the ground over the plant via the angularly extending side members.

The top plate member includes a plurality of circumferentially spaced depressions wherein a portion is offset from the general plane of the plate member to form a horizontal slot on the underside thereof for slidably receiving the securing flange of the top brackets. Thus, when a plurality of bracket means and elongated side members are slidably secured in the circumferentially spaced depressions adjacent the periphery of the plate means, a frusto-conical plant projecting assembly is formed, the assembly tapering outwardly and downwardly from the circular top plate to the ground. When assembled in this fashion, the assembly may be staked vertically into the ground surrounding a plant in one operation without inserting each of the protective side members singly prior to the assembly of the entire device. Furthermore, the entire assembly may be easily assembled and disassembled by means of the slidably secured top brackets thereby providing convenience for storage purpose. Additionally, the elongated side members are of sufficient width to provide full protection against the effects of the elements on the enclosed plant without need of a separate, fully enclosing hood or covering.

Finally, it is significant that the two brackets and the top plate can be sold as a kit, the purchaser providing his own side members. This makes the package less expensive to ship. The user merely purchases wooden slats, secures the brackets to them, and assembles them to the top plate.

These and other objects, advantages, purposes and features of the invention will become apparent from a study of the following description taken in conjunction with the drawings.

BRIEF DESCRIPTION OF THE DRAWINGS

FIG. 2 is an enlarged, perspective view of the plant guard assembly of FIG. 1 shown with its various component elements exploded from their assembled positions for reference purposes;

FIG. 3 is an enlarged, fragmentary, cross-sectional view taken along plane III—III of FIG. 1 showing the top bracket of the present invention slidably received in an integral slot formed in the top plate;

FIG. 4 is an enlarged, fragmentary, cross-sectional view taken along plane IV—IV of FIG. 1 showing the toe bracket of the present invention staked vertically into the ground and supporting the lower end of an elongated side member.

DESCRIPTION OF THE PREFERRED EMBODIMENT

Figure 1:
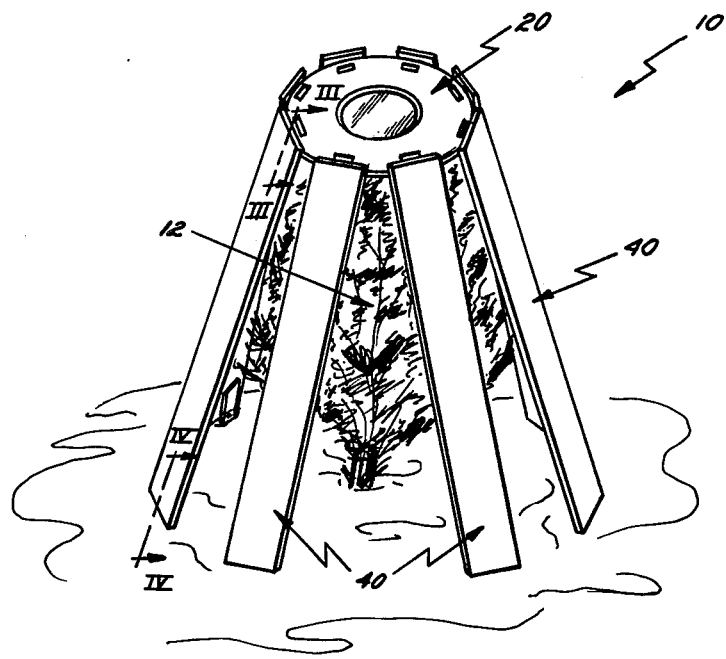
FIG. 1 is a perspective view of the plant guard assembly of the present invention shown staked in place over and around a typical plant to be protected.

FIG. 1 shows the plant guard 10 staked in place about the periphery of a typical plant, shrub, or bush for protection against wind damage, snow and ice buildup and other detrimental effects of the elements. The plant guard 10 comprises four separate elements or members best seen in FIG. 2. A top plane 20 is supported above the top of the plant 12 to be protected by a plurality of elongated side members 40, each secured in place between the ground around the plant and the periphery of the top plate 20 by means of a top bracket 30 and a toe bracket 50. Portions of top brackets 30 are slidably received in integral slots 26 formed in the top plate and enable the assembled side member, top and toe bracket combinations to be assembled about the top plate prior to its installation over the plant 12. Once assembled into the frusto-conically shaped plant guard 10, the entire assembly is staked vertically into the ground surroudning the plant 12 in one operation. The top brackets provide a quick and convevient means for assembling and disassembling the plant guard assembly as a whole, while the toe brackets enable the completely assembled apparatus to be staked vertically into the ground surrounding the plant without separate insertion of each side member, toe and top bracket into the ground and then into the central top plate. Accordingly, this unique relationship of elements greatly facilitates the ease of assembly and placement, as well as the portabililty of the entire structure.

In the preferred embodiment, the top member 20, top brackets 30 and toe brackets 50 are all formed from 16-guage galvanized steel. The elongated side members 40 are preferably formed from wooden boards of a thickness sufficient to stably support the central top plate member over the plant to be protected in all types of weather. Highly weather-resistant woods such as redwood are especially useful in this application. Of course, various other corrosion and weather-resistant materials may also be used to form the various elements of the assembly without deviating from the spirit of the invention.

Figure 5:
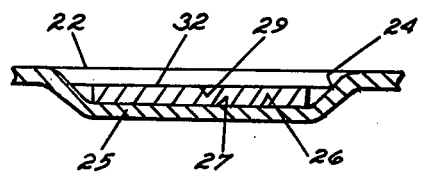
FIG. 5 is an enlarged, fragmentary, cross-sectional view taken along plane V—V of FIG. 3 showing a flange of the top bracket received in an integral slot in the top plate.

Referring now to FIG. 2, top plate 20 comprises a generally planar plate 22 formed in the shape of a circle and including a central depression 23 to strengthen and rigidify the plate. A plurality of integral depressions 24 form a number of slots 26 (FIGS. 3 and 5) on the underside of plate 20. Slots 26 are formed by stamping or otherwise pressing an integral portion 24 of top plate 22 transverse to the plane of plate 22 thereby forming slots 26 parallel to the plane but offset on one side thereof. Depressions 24 forming slots 26 are located on evenly, angularly spaced radii of the circular top plate adjacent the periphery or circumference of the plate 22 but spaced slightly back from that periphery toward the center of the plate. As will be described more fully below, this distance between depressions 24 and the actual periphery of plate 22 provides planar areas 28 and 29 on one surface of the top plate on either side of the depression, in addition to the planar top surface 27 of offset portion 25. All of these areas and surfaces 27, 28 and 29 frictionally engage portions of the top bracket 30 slidably received in slot 26 when the plant guard is assembled.

In the preferred embodiment, eight integral depressions 24 are spaced evenly about the circular top plate 22, although a greater or less number may be provided in accordance with the sides of the side members 40 without deviating from the spirit of the invention. It has been found, however, that eight of the intergral depressions 24 allow side members 40 to be spaced sufficiently to provide excellent protection against the effects of wind, snow and ice, while also providing strong and durable support for the assembly as a whole over long periods of time in all types of weather.

Removably engaged with top plate 22 are a plurality of top brackets 30 which also support the elongated side members 40 as mentioned above. Top brackets 30 each comprise two flanges 32 and 34 formed at a predetermined angle with one another, which angle is represented by X in FIG. 3. In the preferred embodiment, flanges 32 and 34 are rectangular in shape with an integral corrugation or reinforcing rib 36 formed therebetween at corner 35 where the flanges are joined. Each flange 32 of each top bracket 30 is slidably received in one of the slots 26 with the generally planar surfaces on either side thereof engaging planar top surface 27 of depressed portion 25 and planar areas 28 and 29 on either side of the depression on the underside of top plate 22 respectively. The thickness of flange 32 corresponds to the height of slots 26 such that the surfaces of flange 32 engaging planar areas 27, 28 and 29 sufficiently frictionally retain the flange therein when the plant guard 10 is assembled but allow quick sliding removal of flange 32 therefrom when the guard is disassembled.

As shown in FIGS. 2 and 3, flange 34 of top bracket 30 includes two apertures which receive securing means such as screws 38 for securing one end 42 of elongated side member 40 to flange 34. While screws 38 are preferred, other securing means such as nails or suitable adhesives may also be used. Since flanges 32 and 34 are formed at predetermined angle X, side member 40 extends between the edge or periphery of top plate 22 and the ground at the same angle X. Extension of side members 40 at angle X provides sufficient room for the foliage and bodies of the plants covered by guards 10, as shown in FIG. 1. Top brackets 30 thus provide a secure but removable connection between the top end 42 of side member 40 and the circular top plate 22.

Secured to the opposite or bottom ends 44 of each of the elongated side members 40 is one of the toe brackets 50. Like top brackets 30, toe brackets 50 each comprise two flanges 52 and 54 formed at a predetermined angle with one another, which angle is represented by Y in FIG. 4. Angle Y is sufficient to orient flange 54 perpendicular to the general plane of top plate 22 when the plant guard 10 is assembled. Thus, angle Y will be equivalent to 270° minus angle X, angle X being the angle between the flanges of top brackets 30. Consequently, when the flanges 54 of the toe brackets are inserted in the ground perpendicular to the surface thereof, the top plate 22 is supported parallel to the ground surface via the angularly extending side members. Supporting top plate 22 parallel to the ground provides the maximum coverage for the plant when the ground surface is approximately horizontal.

Like flange 34 of top bracket 30, flange 52 of toe bracket 50 includes two apertures through which securing means such as screws 56 are passed to secure bottom end 44 of side member 40 to flange 52. Although flange 52 is rectangular, flange 54 is shaped to facilitate its entry or insertion into the ground around the periphery of a plant to be protected. In the preferred embodiments, the lower portions of flange 54 are cut away in order to taper the flange to a sharpened point 58, as shown in FIG. 2. Consequently, when the ground is dry, compressed or otherwise hard, sharpened point 58 on flange 54 will enable easy insertion of the flanges 54 into the ground.

As mentioned above, flanges 54 of toe brackets 50 are perpendicular to the plane of top plate 22. This perpendicular orientation of the flanges enables the plant to be completely assembled priot to its location around a plant to be protected since, after the assembly of the plant guard, each of the flanges 54 may be pressed vertically or perpendicularly into the ground around the plant merely by pushing directly downwardly on circular top plate 22. The flanges 54 will project into the ground as far as the corner 57 between flanges 52 and 54, as shown in FIG. 4, such that the lower end 46 of elongated side members 40 just touches or engages the surface of the ground. Consequently, the individual side members 40 and toe brackets 50 need not be inserted separately into the ground prior to the engagement of top brackets 30 with the central, circular top plate 22 as would be the case if toe brackets 50 merely formed rectilinear blades projecting in the same plane as or parallel to the plane of side members 40. Rather, the combined side members, top and toe brackets may be engaged with circular top plate 22 to form the plant guard assembly 10, which assembly may then be inserted in one operation around the plant to be protected in the manner described above.

As will be understood from FIGS. 1 and 2, the width of elongated side members 40, represented by W in FIG. 2, is sufficient to provide full protection for the plant covered by the plant guard assembly 10 when assembled with the other side members forming the remainder of the plant guard. This width W is greater than that of brackets 30 and 50. However, the side members 40 do not form a complete enclosure around the covered plant. Further, the width W is not so large as to interfere with the insertion of the remaining side members 40 and top brackets 30 adjacent and on either side of each of the various side members. Consequently, the plant guard assembly 10 provides full protection for a plant covered thereby, since the widths W of the side members block the damaging effects of wind, snow and ice. There is no need for a complete and separate enclosing cover or hood which completely closes off necessary, life-sustaining air circulation, prevents evaporation of water vapor, and/or blocks sunlight from the plant.

The length L of the side members 40, as shown in FIG. 2, is chosen according to the size of the plant to be covered by the plant guard assembly 10. In the preferred embodiment, the length L will be some 8 to 10 inches taller than the height of the plant such that when the side members project outwardly and downwardly at the angle X as shown in FIG. 3, their effective vertical height at the angle X as shown in FIG. 3, their effective vertical height above the ground will still be sufficient to support the circular top plate 22 above the top of the plant. Thus, as will be apparent to those skilled in the art, the size of the entire plant guard assembly may be easily changed to accommodate various sized plants, shrubs, bushes, and the like merely by substituting side members 40 having a greater or less length depending on the size of the plant to be protected.

In summary, the present plant guard 10 provides full and sufficient protection for a plant covered thereby from the destructive effects of the elements. The assembly is quickly and conveniently assembled and disassembled for use and storage without screws or other securing means by means of the sliding engagement of the top bracket with the circular top plate. Consequently, the present plate guard is easily transported to and assembled at various plant locations. Further, the entire assembly may be inserted into the ground over a plant to be protected in one operation without separate insertion of each side member and bracket combination prior to the assembly of the plant guard. Additionally, the plant guard assembly is susceptible of easy modification for the accomodation of various size plants and shrubs merely by substituting different length side members depending on the size of the plant to be protected.

It should be understood that use of the terms "top", "bottom", "downwardly", "vertically", and "horizontally" are used merely for explanation purposes and are not intended to limit the scope of the invention defined herein.

While one form of the invention has been shown and described, other forms will now be apparent to those skilled in the art. Therefore, it will be understood that the embodiment shown in the drawings and described above is merely for illustrative purposes, and is not intended to limit the scope of the invention which is defined by the claims which follow.

The embodiments of the invention in which an exclusive property of privilege is claimed are defined as follows:

1. A plant protection apparatus for plants such as bushes, shrubs, and the like, said apparatus being disassembleable and adapted to be staked vertically into the ground as a complete unit when assembled and comprising in combination plate means the major extent of which is imperforate, bracket means and a plurality of elongated side members; said plate means including a plate member supporting over a plant to be protected by the combination of said bracket means and said elongated side members said plate member including a central integral depression for strengthening said plate member and plurality of other integral depressions, each of said other depressions forming a slot having open ends; said bracket means including a plurality of top bracket means each having first and second flanges formed at a predetermined angle to one another for securing said side members about the periphery of said plate member at spaced intervals in said slots; each of said top bracket first flanges being slidably received in one of said slots in said plate member; said top bracket second flange including means for securing said top bracket to one end of one of said side members; said bracket means also including a plurality of toe bracket means separate from said top bracket means each having first and second flanges for staking said apparatus vertically into the ground while supporting said side members at an angle to be ground, each of said toe bracket means including a first flange having means for securing it to an end of one of said side members and a second flange for staking said one side member vertically in the ground, said first toe bracket flange formed at an angle to said second toe bracket flange such that said second toe bracket flange is generally perpendicular to said plate member; said plate member, bracket means and side members forming a general enclosure with said side members extending downwardly from the periphery of said plate member, said side members being in sufficient number and width to substantially enclose the side areas of the plant but leaving generally vertically extending spaces between said members for air circulation to the plant whereby said entire apparatus is staked vertically into the ground over a plant without separately inserting each combination side member and bracket means into the ground before assembling the complete apparatus.

2. The apparatus of claim 1 wherein said plate member is circular in shape, said apparatus being frusto-conical in overall shape such that said second toe bracket flanges stake said side members around the circumference of said plant.

3. The apparatus of claim 1 wherein an integral rib extends between said first and second flanges of said top bracket; said second flange including at least one aperture for securing said top bracket to said side member.

4. The apparatus of claim 1 wherein one of said toe bracket flanges includes means for facilitating the entry of said flange into the ground; the remaining toe bracket flange including at least one aperture for securing said toe bracket to one end of one of said side members.

5. The apparatus of claim 1 wherein said slots are substantially vertical depressions and said first flanges of said top bracket means are slidably, substantially horizontally, received therein.

6. The apparatus of claim 1 wherein said plate member is circular in shape; said slots being spaced evenly around said plate member adjacent the periphery thereof, each of said slots lying on a radius of said circular member intermediate the circumference and center of said member.

7. A plant guard kit comprising a plurality of bracket means and a central protective member the major portion of which is imperforate for forming a portion of a plant protecting assembly having a plurality of elongated, protective side members spaced around the periphery of said protective member and extending between said protective member and the ground, said protective member and bracket means when assembled with the side members being adapted to form a general enclosure for fitting over and around a plant, the side members being in sufficient number and width to substantially enclose the side areas of a plant but leaving generally vertically extending spaces between members for air circulation to the plant; said bracket means allowing the elongated side members to be joined to said protective member to form a protective assembly and further allowing said assembly to be staked vertically into the ground in its entirety at one time; each of said bracket means including separate top and toe brackets each adapted to be secured to one elongated side member; said central protective member being a plate member including slots formed in said plate member; each of said top brackets including a first flange for being slidably received in one of said slots for connecting said top bracket to said central protective member and a second flange for securing said top bracket to one end of one of the side members; each of said toe brackets including a first flange for securing said toe bracket to the end opposite the one end of the side member to which said top bracket is attached and a second flange extending generally perpendicularly to said central protective member when said top and toe brackets and the side member are asembled to said central protective member, said second flanges of said toe brackets each including portions converging to a point to facilitate entry into the ground, said second toe bracket flange vertically staking said toe bracket as well as the entire plant protecting assembly into the ground surrounding a plant to be protected.

8. The apparatus of claim 7 wherein said respective flanges of both said top and toe brackets are formed at predetermined angles with one another whereby said side members extend at an angle to the ground.

9. A plant guard comprising a frusto-conical assembly which is disassembleable and adapted to be staked as a unit into the ground over a plant when asembled, said assembly including in combination a generally planar, circular cover means the major portion of which is imperforate and having a plurality of spaced receptacles therein, and a plurality of downwardly extending, elongated, side members; said side members extending from the periphery of said cover means, forming the sole support therefor, and forming a general frusto-conical enclosure for fitting over and around a plant, said side members being in sufficient number and width to substantially enclose the side areas of the plant but leaving generally vertically extending spaces between said members for air circulation to the plant; each of said side members having a first bracket means secured to one end thereof and having an extending flange being slidably received in one of said receptacles in said cover means for securing said side member to said cover means and a second bracket means secured to the opposite end of said side member for vertically staking said side member and said assembly, in its entirety, over a plant to be protected; each of said second bracket means including a flange extending downwardly from one of said side members and perpendicularly to said plane of said cover means whereby said entire plant guard is staked vertically as a unit into the ground when said side members are assembled to said cover means; said first bracket means being a top bracket on each side member, said top bracket including two flanges formed at a predetermined angle with one another; each flange including a planar area; the planar area of one flange comprising said extending, first bracket flange which is slidably received in one of said receptacles in said cover means; the planar area of the other of said flanges including means for securing said top bracket to said side member.

10. The plant guard of claim 9 wherein said cover means comprises a top plate lying substantially in one plane, said receptacles including a plurality of vertical, integral depressions forming horizontal slots; said slots each receiving said extending flange of said first bracket means.

11. The plant guard of claim 9 wherein said cover means comprises a top plate lying substantially in one plane, said receptacles including a plurality of integral portions offset from said plane on one side of said plate; said integral portions forming slots between the remaining areas of said plate and said integral portions; said slots each receiving said extending flange of said first bracket means.

12. The plant guard of claim 9 wherein an integral reinforcing rib extends between said flanges.

13. A plant guard comprising a frusto-conical assembly which is disassembleable and adapted to be staked as a unit into the ground over a plant when assembled, said assembly including in combination a generally planar, circular cover means the major portion of which is imperforate and having a plurality of spaced receptacles therein, and a plurality of downwardly extending, elongated, side members; said side members extending from the periphery of said cover means, forming the sole support therefor, and forming a general frusto-conical enclosure for fitting over and around a plant, said side member being in sufficient number and width to substantially enclose the side areas of the plant but leaving generally vertically extending spaces between said members for air circulation to the plant; each of said side members having a first bracket means secured to one end thereof and having an extending flange being slidably received in one of said receptacles in said cover means for securing said side member to said cover means and a second bracket means secured to the opposite end of said side member for vertically staking said side member and said assembly, in its entirety, over a plant to be protected; each of said second bracket means including a flange extending downwardly from one of said side members and perpendicularly to said plane of said cover means whereby said entire plant guard is staked vertically as a unit into the ground when said side members are assembled to said cover means; said second bracket means is a toe bracket comprising two flanges formed at a predetermined angle with one another; at least one flange including a planar area including means for securing said bracket to a side member; the remaining flange comprising the said flange of said second bracket means, said remaining flange ending in a tapered point for facilitating the insertion of said remaining flange into the ground.

* * * * *